United States Patent
Lee et al.

(10) Patent No.: US 10,474,578 B2
(45) Date of Patent: Nov. 12, 2019

(54) UTILIZATION-BASED THROTTLING OF HARDWARE PREFETCHERS

(71) Applicant: Oracle International Corporation, Redwood City, CA (US)

(72) Inventors: Hyunjin Abraham Lee, San Jose, CA (US); Yuan Chou, Los Gatos, CA (US); John Pape, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 128 days.

(21) Appl. No.: 15/691,302

(22) Filed: Aug. 30, 2017

(65) Prior Publication Data

US 2019/0065376 A1 Feb. 28, 2019

(51) Int. Cl.
*G06F 12/00* (2006.01)
*G06F 12/0862* (2016.01)
*G06F 12/0855* (2016.01)

(52) U.S. Cl.
CPC ...... *G06F 12/0862* (2013.01); *G06F 12/0855* (2013.01); *G06F 2212/1024* (2013.01); *G06F 2212/602* (2013.01); *G06F 2212/6026* (2013.01)

(58) Field of Classification Search
None
See application file for complete search history.

(56) References Cited

U.S. PATENT DOCUMENTS

| | | | | |
|---|---|---|---|---|
| 6,820,173 | B1* | 11/2004 | Bittel | G06F 12/0862 711/137 |
| 7,603,526 | B2* | 10/2009 | VanStee | G06F 13/161 711/137 |
| 7,720,857 | B2* | 5/2010 | Beringer | G06F 16/9038 707/766 |
| 7,958,317 | B2* | 6/2011 | Speight | G06F 12/0862 711/119 |
| 8,255,631 | B2 | 8/2012 | Chen | |
| 8,775,775 | B1 | 7/2014 | Ela,bara | |
| 9,483,406 | B2 | 11/2016 | Hooker | |
| 9,507,596 | B2 | 11/2016 | Jagannathan | |
| 9,645,935 | B2* | 5/2017 | Bose | G06F 12/0862 |
| 2005/0076181 | A1* | 4/2005 | Hsu | G06F 12/0862 711/137 |
| 2005/0257005 | A1* | 11/2005 | Jeddeloh | G06F 12/0215 711/115 |

(Continued)

*Primary Examiner* — John A Lane
(74) *Attorney, Agent, or Firm* — Meyertons, Hood, Kivlin, Kowert & Goetzel, P.C.

(57) ABSTRACT

An system for prefetching data for a processor includes a processor core, a memory, a cache memory, and a prefetch circuit. The memory may be configured to store information for use by the processor core. The cache memory may be configured to issue a fetch request for information from the memory for use by the processor core. The prefetch circuit may be configured to issue a prefetch request for information from the memory to store in the cache memory using a predicted address, and to monitor, over a particular time interval, an amount of fetch requests from the cache memory and prefetch requests from the prefetch circuit. The prefetch circuit may also be configured to disable prefetch requests from the memory for a subsequent time interval in response to a determination that the amount satisfies a threshold amount.

20 Claims, 8 Drawing Sheets

(56) References Cited

U.S. PATENT DOCUMENTS

| | | | |
|---|---|---|---|
| 2007/0005902 A1* | 1/2007 | Petersen | G06F 12/0862 711/137 |
| 2009/0019229 A1* | 1/2009 | Morrow | G06F 12/0862 711/137 |
| 2009/0199190 A1* | 8/2009 | Chen | G06F 9/383 718/102 |
| 2010/0268893 A1* | 10/2010 | Luttrell | G06F 12/0862 711/137 |
| 2011/0264864 A1* | 10/2011 | Kadambi | G06F 12/0862 711/137 |
| 2012/0054448 A1* | 3/2012 | Thompson | G06F 12/0862 711/137 |
| 2013/0013867 A1* | 1/2013 | Manne | G06F 12/0862 711/137 |
| 2014/0108740 A1 | 4/2014 | Rafacz | |
| 2014/0173217 A1* | 6/2014 | Kalamatianos | G06F 12/0862 711/137 |
| 2015/0058592 A1* | 2/2015 | Bhattacharjee | G06F 12/0215 711/205 |
| 2015/0234745 A1* | 8/2015 | Roy | G06F 12/0862 711/125 |
| 2017/0083339 A1* | 3/2017 | Burger | G06F 9/3004 |
| 2017/0293560 A1* | 10/2017 | Eckert | G06F 12/0862 |
| 2017/0300418 A1* | 10/2017 | Reed | G06F 12/0862 |
| 2017/0371790 A1* | 12/2017 | Dwiel | G06F 12/0811 |

\* cited by examiner

UTILIZATION-BASED THROTTLING OF HARDWARE PREFETCHERS

BACKGROUND

Technical Field

The embodiments disclosed herein generally relate to processors and, more particularly, to implementation of data prefetch systems.

Description of the Related Art

To improve execution performance, a processor may include a prefetch circuit, also referred to herein as a prefetcher, for one or more cache memories to reduce memory access times. A prefetcher for a given cache may read data from a lower level cache or a system memory in anticipation of an upcoming request from the cache, i.e., fetch data before a processing core requests the data. A prefetcher may track memory access patterns corresponding to one or more software processes running in the processing core. Using these patterns, the prefetcher may then read data before the cache request it.

Prefetchers may fetch data using the same memory resources as other fetched data. In some processors, prefetchers may compete for memory resources with other prefetchers and/or fetch units that are retrieving data after a processing core or cache has requested it. If many memory access requests are being issued by fetch units and prefetchers, then memory resources may be overloaded and memory access times may increase as memory requests are queued and performed in turn as resources become available. Such memory resource overloads may reduce performance of the processor.

SUMMARY

Various embodiments of a system for prefetching data for a processor may include a processor core, a memory, a cache memory, and a prefetch circuit. The memory may be configured to store information for use by the processor core. The cache memory may be configured to issue a fetch request for information from the memory for use by the processor core. The prefetch circuit may be configured to issue a prefetch request for information from the memory to store in the cache memory using a predicted address, and to monitor, over a particular time interval, an amount of fetch requests from the cache memory and prefetch requests from the prefetch circuit. The prefetch circuit may also be configured to disable prefetch requests from the memory for a subsequent time interval in response to a determination that the amount satisfies a threshold amount.

In a further embodiment, to monitor the amount, the prefetch circuit may be further configured to track a number of idle cycles in a fetch pipeline associated with the cache memory. In another embodiment, to disable prefetch requests from the memory for the subsequent time interval, the prefetch circuit may be further configured to suspend issuing of prefetch requests for the subsequent time interval in response to a determination that the number of idle cycles is less than a threshold number.

In one embodiment, the prefetch circuit may be further configured to resume issuing of prefetch requests for a next time interval in response to a determination that the number of idle cycles in the fetch pipeline remains above the threshold number for a given time interval. In an embodiment, the prefetch circuit may be further configured to determine an accuracy value for issued prefetch requests over the particular time interval, and to disable prefetch requests from the memory for the subsequent time interval in response to a determination that the accuracy value satisfies a threshold value.

In a further embodiment, to determine the accuracy value, the prefetch circuit may also be configured to increment, over the particular time interval, a first count value for each issued prefetch request by the prefetch circuit, and to increment, over the particular time interval, a second count value for each cache hit that includes information stored as a result of a prefetch request. The prefetch circuit may be further configured to determine, at an end of the particular time interval, the accuracy value based on the first count value and the second count value. In another embodiment, the prefetch circuit may be further configured to set a particular value in each cache line that includes information stored as a result of a prefetch request.

BRIEF DESCRIPTION OF THE DRAWINGS

The following detailed description makes reference to the accompanying drawings, which are now briefly described.

Figure 1:
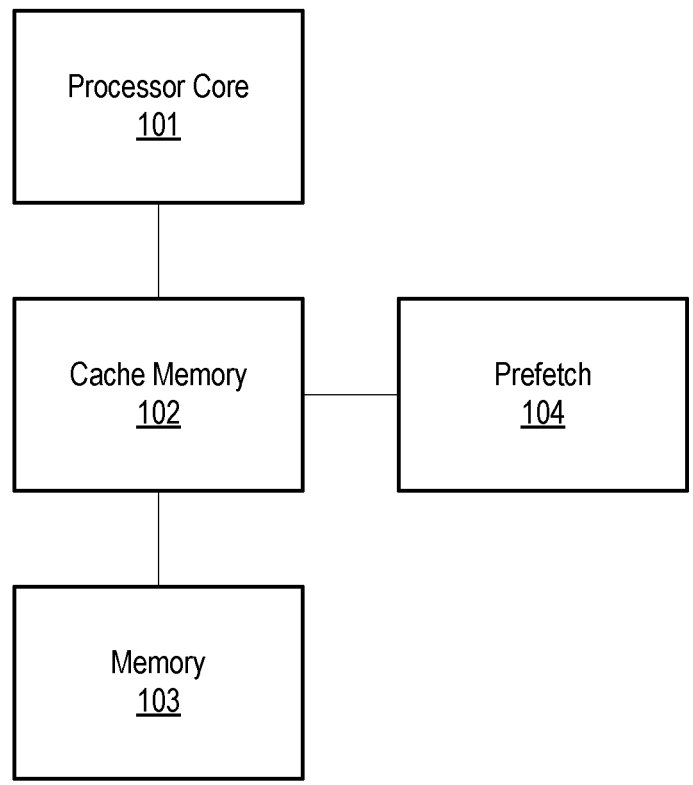
FIG. 1 is a block diagram illustrating an embodiment of a memory sub-system in a processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a processor core (or simply, a "core") may refer to a unit of a processor that is capable of executing program instructions and processing data independently of other processor cores within the processor, such that multiple cores may execute instructions concurrently. Performance of a processor core may be impacted by a multitude of factors, including, but not limited to, processor clock speed, the number of cores in the processor, a number of caches in the processor, and a size of the included caches.

In some embodiments, a mechanism that may be utilized for improving the performance of a processor core is the use of a prefetcher to improve the performance and/or the efficiency of memory accesses. As used herein, a "prefetcher" refers to a circuit configured to fetch one or more instructions before an execution unit or other processing circuit in a processor core requests the one or more instructions. Working in combination with a cache, a prefetcher may improve a flow of information into a processor by anticipating which data may be used by a particular software process (also commonly referred to as a process thread) and reading this data before the processor requests the data. If the prefetcher has accurately anticipated the processor's data needs, then, in response to a data request from a processor, the requested data may be available to the processor with little or no delay.

Data may be fetched from various memories by any of a variety of requestors. Each core in a multicore processor may generate memory requests from either a fetch unit or prefetcher. In some embodiments, a cache shared among two or more cores may include a fetch circuit as well as prefetcher. Various memory requestors, including prefetchers, may share memory resources when fetching data. A large number of memory access requests may result in memory resources becoming overloaded and subsequently increasing memory access times. Performance of the processor may be negatively impacted.

Various embodiments of prefetchers and methods to manage the prefetching operations are discussed in this disclosure. The embodiments illustrated in the drawings and described below may provide techniques for managing the operations of a prefetcher in a computing system that may reduce memory resource overloading from prefetcher requests.

A block diagram illustrating an embodiment of a memory sub-system included in a processor is illustrated in FIG. 1. Processor 100 includes processor core 101, coupled to cache memory 102. Cache memory 102 is further coupled to memory 103 and prefetch circuit 104.

Processor core 101 may be configured to execute instructions and to process data according to a particular Instruction Set Architecture (ISA). In various embodiments, processor core 101 may be configured to implement any suitable ISA, such as, for example, SPARC® V9, x86, PowerPC® or MIPS®. Additionally, in some embodiments, processor core 101 may be configured to execute multiple threads concurrently (referred to herein as being "multi-threaded"), where each thread may include a set of instructions that may execute independently of instructions from another thread. Although a single processor core 101 is illustrated, in other embodiments it is contemplated that any suitable number of cores may be included within a processor, and that each such core may be multi-threaded.

Cache memory 102 may reside within processor core 101 or may reside between processor core 101 and other memories. In one embodiment, cache memory 102 may be configured to cache instructions and data for use by processor core 101. Cache memory 102 may correspond to any one of various levels of cache memory, such as, e.g., L1, L2, and L3. For example, one embodiment of a processor may include an L1 cache within processor core 101, while L2 cache may be represented by cache memory 102 and L3 cache is included as a part of memory 103. In a multicore processor, each core may have one or more L1 cache memories and may share one or more L2 and/or L3 caches. In various embodiments, cache memory 102 may be implemented using set-associative or direct-mapped techniques.

It is noted that an entry in cache memory 102 may be referred to as a cache line. Each cache line in cache memory 102 may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A given processor core may access a cache with a direct address of the memory location, a translated address based on lookup tables, or through an address calculated based on an instruction's address mode.

Memory 103, in the illustrated embodiment, includes system memory for storing active software, such as, for example, an application or operating system being executed by processor core 101. In some embodiments, memory 103 may also include reserved locations for storing information in an L2 and/or L3 cache. In some embodiments, memory 103 may include one or more memory interfaces for accessing one or more types of system memory included on integrated circuits (ICs) that are separate from an IC including processor 100. Such memory interfaces may be configured to manage the transfer of data between cache memory 102 and memory 103 in response to cache fetch requests. Memory 103 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example.

In the illustrated embodiment, prefetch circuit 104 uses predicted addresses to generate memory prefetch requests in order to fill one or more cache lines in cache memory 102 with information (i.e., data and/or instructions) to be used by processor core 101. In systems with more than one level of cache memory, prefetch circuit 104 may generate memory prefetch requests for one cache memory, such as, for example, an L2 cache. In some embodiments, multiple prefetch circuits may be included, with each prefetch circuit generating memory requests for a particular cache memory. Prefetch circuit 104 may generate a memory prefetch request that results in information being retrieved from a higher level cache. For example, if prefetch circuit 104 generates prefetch requests for an L2 cache, then these prefetch requests may be sent to an L3 cache. As used herein, a "higher" cache or "higher" memory refers to cache and memories that are farther removed from processor core 101 and "lower" cache refers to the opposite. For example system memory is higher than L3 cache, and L2 cache is lower than L3 cache. If a particular prefetch request misses in the L3 cache, then the L3 cache generates a memory fetch request for the requested information from system memory included in memory 103. As used herein, a cache "hit" refers to a request for information from a cache memory where the cache memory is currently storing the requested information, whereas a cache "miss" refers to the case in which the cache memory is not currently storing the requested information, and therefore has to retrieve the information from a higher level cache or system memory.

Successful prefetch requests may result in cache memory 102 receiving information before processor core 101 requests the information, thereby allowing processor core 101 to execute instructions without waiting for a memory access to return the requested information. In some cases, prefetched information may not arrive in cache memory 102 before processor core 101 is ready to use the information, but the prefetching may still reduce a time from when processor core 101 is ready for the data and when the data is available. Unsuccessful prefetch requests may result from an incorrect address prediction. Address prediction is based on patterns of addresses used for memory accesses over time. If processor core 101 deviates from this pattern, or if a pattern is incorrectly identified, then a misprediction may occur, resulting in information being retrieved when it isn't currently needed.

Memory access requests generated by prefetch circuit 104 may utilize memory resources common to other memory requesting circuits (or "requestors" for short). For example, prefetch circuit 104 may generate a prefetch request to fill an L2 cache line from L3 cache. During this time, L1 cache may issue a memory request to L2 cache that misses, causing fetch circuits in L2 cache to issue a memory request from L3 cache. Some hardware resources used to retrieve information from L3 cache into L2 cache, e.g., an L2 fetch pipeline, may be used for both the prefetch request and the cache miss request. In a multicore processor, a large number of requestors may be active and, in particular, during times of high computing activity, memory resources may become overloaded, resulting in memory request queues filling up, thereby causing requestors to have to reissue memory access requests due to full request queues. Such a situation may cause a noticeable performance drop for users of the processor.

In the illustrated embodiment, prefetch circuit 104 includes circuitry for monitoring the memory resources. Using this monitoring circuitry, prefetch circuit 104 may suspend issuing memory prefetch requests during times of high utilization of corresponding memory resources, in a process referred to herein as prefetch "throttling." While prefetch requests are suspended, cache memories may be filled by fetch circuits as memory addresses are accessed by processor core 101. By throttling prefetch requests, fewer memory access requests may be generated during periods of high memory utilization, allowing memory resources to perform memory operations for requests that are in queue. Once requests in the queue have been fulfilled and the memory resource utilization drops to a less active level, then prefetch circuit 104 may re-enable memory prefetch requests. Additional details corresponding to prefetch throttling are presented below.

It is noted that FIG. 1 is merely an example. The illustrated embodiment includes components related to the disclosed concepts. In other embodiments, additional components may be included. For example, other embodiments may include several levels of cache memory and/or multiple processor cores.

Figure 2:
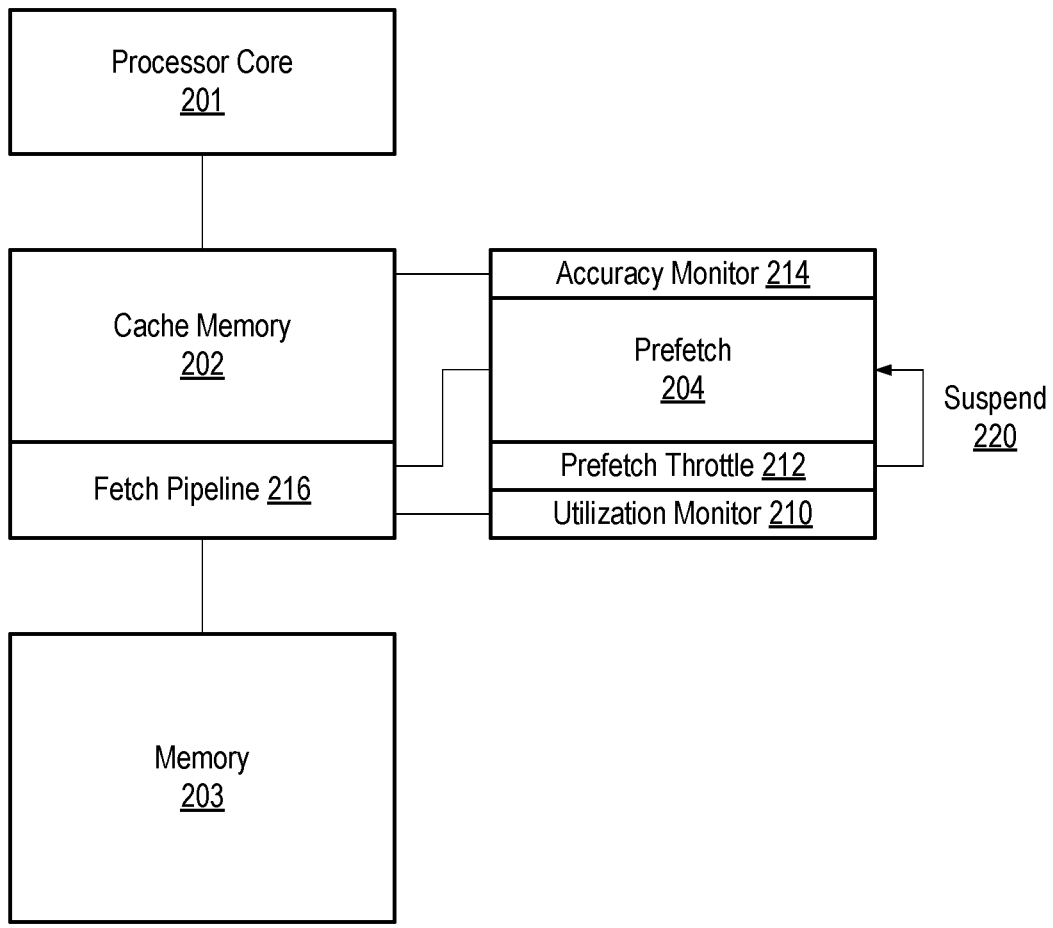
FIG. 2 shows a block diagram of an embodiment of a memory prefetching sub-system in a processor.

Turning to FIG. 2, a block diagram of an embodiment of a memory prefetching sub-system in a processor is shown. In the illustrated embodiment, processor 200 corresponds to processor 100 as illustrated in FIG. 1. Processor 200 includes processor core 201, cache memory 202, and memory 203. Processor core 201, cache memory 202, and memory 203 may correspond to the similarly named and numbered elements in FIG. 1, and, therefore, function as described above. In addition, fetch pipeline 216 is coupled to cache memory 202. In some embodiments, fetch pipeline 216 may be included as a part of cache memory 202 or as a separate circuit coupled to cache memory 202. Prefetch circuit 204, is coupled to fetch pipeline 216, as well as to utilization monitor 210, prefetch throttle 212, and accuracy monitor 214. In some embodiments, utilization monitor 210, prefetch throttle 212, and accuracy monitor 214 may be coupled to prefetch circuit 204, while in other embodiments, these circuits may be included within prefetch circuit 204.

Fetch pipeline 216, in the illustrated embodiment, includes hardware resources used to fetch information from higher level memories and fill cache lines in cache memory 202. In response to a cache miss in cache memory 202 resulting from a memory request from processor core 201, circuits in cache memory 202 cause fetch pipeline 216 to request the missing information from a higher memory, i.e., a higher level cache, system memory, or a non-volatile memory. Similarly, prefetch circuit 204 may in the illustrated embodiment, issue prefetch requests utilizing fetch pipeline 216 to fill cache memory 202 with information that has been predicted to be accessed by processor core 201.

Utilization monitor 210 includes hardware circuits for monitoring memory resources, as described above. In the illustrated embodiment, utilization monitor 210 monitors an amount of activity in fetch pipeline 216. Both fetch and prefetch requests are fulfilled by fetch pipeline 216 by retrieving requested information from a higher cache and/or system memory. To determine activity in the fetch pipeline, both fetch and prefetch requests may be monitored. The "amount" of activity may be tracked in various ways, including as a combined number of fetch and prefetch requests, a percentage of bandwidth of fetch pipeline 216 that is being utilized by fetch and prefetch requests, a value indicating a range of values into which the number of fetch and prefetch requests currently falls (e.g., an activity level), or any other suitable method for indicating an amount of activity in fetch pipeline 216. In some embodiments, utilization monitor 210 tracks a number of fetch and prefetch requests issued to fetch pipeline 216 over a particular time interval. In the illustrated embodiment, utilization monitor 210 tracks a number of processor cycles in which fetch pipeline 216 is idle over a particular time interval. Fetch pipeline 216 may be idle when it is not processing either fetch or pre-fetch requests. At the end of a time interval, utilization monitor 210 may include a count of a number of idle cycles along with other tracked utilization data, and send this utilization data to prefetch throttle 212. Utilization monitor 210 may clear the idle cycle count and other values tracked during the time interval and restarts these counts during a next time interval. As used herein, an "idle cycle" refers to a processor cycle in which fetch pipeline 216 is not performing an action associated with a fetch request or a prefetch request.

Prefetch throttle 212, in the illustrated embodiment, includes hardware circuits to receive the utilization data from utilization monitor 210. Using this information, prefetch throttle 212 determines whether prefetch circuit 204 should be disabled, i.e., suspend issuing prefetch requests, for a next time interval. For example, prefetch throttle 212 may determine if the idle cycle count satisfies a utilization suspend threshold. Since fewer idle cycles may indicate fetch pipeline 216 is more active, satisfying the utilization suspend threshold may correspond to the idle cycle count being less than the utilization suspend threshold. If prefetch throttle determines the utilization suspend threshold is satisfied, then prefetch throttle 212 asserts suspend signal 220, which is received by prefetch circuit 204. Prefetch circuit 204, in response to the assertion of suspend signal 220, suspends issuing further prefetch requests to fill cache memory 202.

Utilization monitor 210, in the illustrated embodiment, continues to monitor fetch pipeline 216 and to send the tracked data to prefetch throttle 212 at the end of each time interval. Prefetch throttle 212 compares the received tracked data to an appropriate utilization resume threshold, and, if the utilization resume threshold is satisfied, de-asserts suspend signal 220. In response to the de-assertion of suspend signal 220, prefetch circuit 204 may resume issuing prefetch memory requests to fill cache memory 202. In various embodiments, the resume and suspend thresholds may be the same or different. For example, the utilization resume threshold may have a higher value than the utilization suspend threshold, such that suspend signal 220 is asserted if an idle count is below the utilization suspend threshold and then de-asserted if a later idle count is above the higher utilization resume threshold. In some embodiments, prefetch throttle 212 may wait until the utilization resume threshold has been satisfied for two or more time intervals in a row before de-asserting suspend signal 220. Thresholds may be determined during design.

In one embodiment, processor 200 includes accuracy monitor 214. Accuracy monitor 214 includes circuitry to monitor cache lines that were prefetched into cache memory 202 using prefetch circuit 204. Accuracy monitor 214 may increment two count values. The first count value corresponds to a total count value and is incremented for each cache line that is fetched by prefetch circuit 204. The second count value corresponds to a used count value and is incremented when one of these prefetched cache lines is accessed by a lower memory (e.g., an L1 cache or a fetch unit in processor core 201). Accuracy monitor 214 increments the two count values over a particular time interval, for example, a same time interval as used by utilization monitor 210. At the end of the particular time interval, accuracy monitor 214 determines, using the two count values, a value indicative of the accuracy of prefetch requests generated by prefetch circuit 204. For example, accuracy monitor 214 may generate an accuracy ratio by dividing the used count value by the total count value. In some embodiments, accuracy monitor 214 may additionally multiply the quotient by a predetermined value in order to generate a result with a value within a particular range of values. This accuracy value may then be sent to prefetch throttle 212. Accuracy monitor 214 may clear the two count values and begin incrementing each value as described during a next time interval.

In some embodiments, accuracy monitor 214 may track a moving average of the total count value and used count value. In such embodiments, at the end of the particular time interval, the current total count value and the current used value may each be added to respective running average values. For example, at the end of the particular time interval, both the current total count and the average total count values may be divided by two (e.g., each binary value is shifted right by one digit), and then added together to generate a new average total count value. Such a running average may weigh the average total count value more heavily to the most recent total count values, while maintaining some influence for older total count values. A similar process may be used to generate an average used count value using the current used count value. After the average total count and average used count values are determined, the current total count and current used count values may be cleared for a next time interval while the newly determined average count values maintain their current value into the next time interval. An accuracy value may then be determined using the average count values using, e.g., a process as described for the accuracy ratio above.

Prefetch throttle 212 receives the accuracy value and determines whether prefetch circuit 204 should be disabled for a next time interval based on this accuracy value. Similar to the utilization data described above, prefetch throttle 212 may determine if the accuracy value satisfies an accuracy suspend threshold. Since a lower accuracy may indicate that prefetch circuit 204 is not fetching information that is currently being used by processor core 201, satisfying the accuracy suspend threshold may correspond to the accuracy value being less than the accuracy suspend threshold. If prefetch throttle determines the accuracy suspend threshold is satisfied, then prefetch throttle 212 asserts suspend signal 220 and prefetch circuit 204 suspends issuing further prefetch request to fill cache memory 202. An accuracy resume threshold, similar to the utilization resume threshold described above, is used to determine if suspend signal 220 should be de-asserted.

In some embodiments, prefetch throttle 212 may use the utilization data and the accuracy value independently, asserting suspend signal 220 if either suspend threshold is satisfied. In other embodiments, prefetch throttle 212 may base a suspend decision on a combination of the two data items. In one embodiment, prefetch throttle 212 may use the accuracy value to adjust the utilization suspend threshold. For example, prefetch throttle 212 may compare the accuracy value to one or more accuracy thresholds. If the accuracy value is in a high range, then the utilization suspend threshold may be increased, and vice versa if the accuracy is in a low range. A middle range may be used to leave the utilization suspend threshold at a current value. The utilization resume thresholds may be adjusted in a similar manner. Variations of this process are contemplated, such as, for example, adjusting the accuracy thresholds based on utilization data, or scaling utilization thresholds based on the accuracy value rather than using low, medium, and high ranges.

In order to identify cache lines that were prefetched in cache memory 202, these prefetched cache lines may be flagged when stored in cache memory 202. For example, a cache line may include one or more bits (referred to herein as a "prefetch identifier," or "prefetch ID") set, after the prefetch occurs, to a particular value to indicate that the cache line was fetched in response to prefetch request issued by prefetch circuit 204, and reset to an alternate value otherwise. When an identified prefetched cache line is used, in addition to incrementing the current used count value, the prefetch ID may be reset. By resetting the prefetch ID after a first use of the corresponding cache line, each prefetched cache line may be counted once in determining the accuracy value. Otherwise, if a software process being executed by processor core 201 repeatedly accesses addresses associated with a particular cache line, the current used count value may be incremented for each access. This could generate a high accuracy value even if no other prefetched cache line is used. Counting each prefetched cache line only once may improve the usefulness of the accuracy value. It is noted that, if a prefetched cache line is used and then later cleared (i.e., evicted), and is then prefetched again later, the prefetch ID will be set after the second prefetch operation.

It is also noted that the system of FIG. 2 is merely an example and functional circuits are limited to emphasize the functionality of a memory prefetch system. In other embodiments, additional and/or different functional circuits may be included. In other embodiments, some circuits may be omitted, such as, for example, accuracy monitor 214.

Figure 3A:
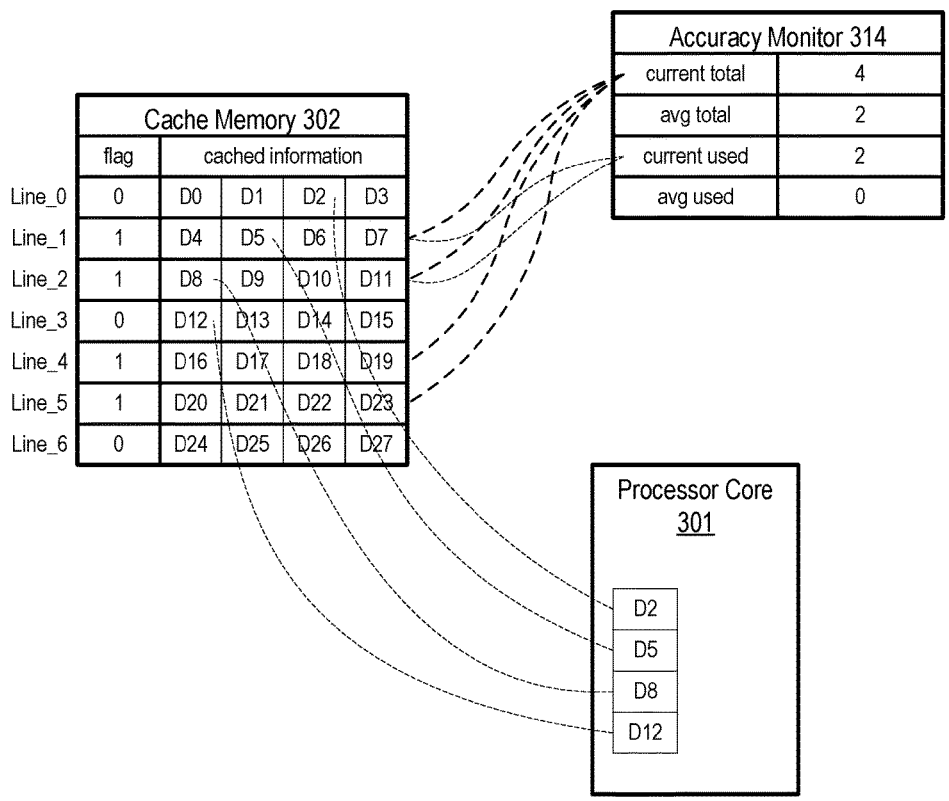
FIG. 3A depicts an embodiment of data tables associated with a cache and a prefetch circuit.

Moving to FIG. 3A, illustrations of an example of data tables associated with a cache and a prefetch circuit are depicted. In the illustrated embodiment, processor core 301 may correspond to processor cores 101 or 201 in FIGS. 1 and 2, respectively, and shows a portion of an instruction pipeline within the core. Cache memory 302 depicts a logical representation of how data is organized within a cache memory such as, for example, cache memories 102 or 202. Accuracy monitor 314 shows four values that may be tracked by an accuracy monitoring circuit such as, accuracy monitor 214, for example.

Cache memory 302 may correspond to any suitable cache memory in a processing system. In the illustrated embodiment, cache memory 302 corresponds to an L2 cache memory that is coupled to a prefetch circuit, such as, for example, prefetch circuit 204 in FIG. 2. Cache memory 302 may be organized into multiple cache lines as indicated by line_0 through line_6, with each line including cached information and a flag. Each line may hold any suitable bytes of information corresponding to range of memory addresses. In the illustrated embodiment, four pieces of information are shown for each cache line, although any suitable number may be used in other embodiments. The cached information includes information fetched in response to a prefetch request from prefetch circuit 204 as well as information fetched by fetch circuits in cache memory 302. Each cache line includes information about the cache line, including a bit to indicate if the respective cache line was fetched by fetch circuits in cache memory 302 (represented herein by a value of "0") or by prefetch circuit 204 (represented herein by a value of "1"). The cache line may include additional flags, as well including a tag that includes references to the original address of the information in a system memory. Additional flags may include coherency data in relation to other memories, in which the same information may be stored and/or the type of information stored, such as instructions or data. For clarity, this additional information is not represented in FIG. 3A.

As a software program is executed, processor core 301 may retrieve various pieces of information from cache memory 302. As shown, processor core 301 retrieves item D2 from line_0, item D5 from line_1, item D8 from line_2, and item D12 from line_3. As indicated by the flag for each cache line, line_0 and line_3 were fetched by the fetch circuits of cache memory 302, while line_1 and line_2 were fetched by prefetch circuit 204.

Accuracy monitor 314, in the illustrated embodiment, functions as described for accuracy monitor 214 above. Four values are tracked by accuracy monitor 314: a current total count, an average total count, a current used count, and an average used count. In some embodiments, the current total count value and the current used count value may be implemented as respective counter circuits. In the illustrated example, it is assumed that cache lines line_0 through line_6 have been fetched within a current time interval. In this current time interval, four of the fetched cache lines have been fetched by prefetch circuit 204, including line_1, line_2, line_4, and line_5. The remaining cache lines have been fetched by the fetch circuits of cache memory 302. In the current time interval, information from two of the prefetched cache lines, line_1 and line_2, have been used by processor core 301. It is noted that the flag value indicating that line_1 and line_2 were prefetched remains set to "1" in FIG. 3A. After accuracy monitor 314 increments the current used value to "2" as shown, the flag values of these two used prefetched cache lines will be reset to "0."

The values of average total count and average used count, as shown, may reflect the values after completion of the prior time interval. At the end of the current time interval, accuracy monitor 314 determines new values for both the average total count and the average used count, based on the values of the current total count and current used count at the end of the time interval. If the illustrated values reflect the count values at the end of the time interval, then, in one embodiment, accuracy monitor 314 determines the new average count values by dividing each value by two, and then adding the divided current total count (i.e., "2") to the divided average count (i.e., "1") to set a new average total count ("3"). The new average used value may be similarly determined, resulting in a new average used count of "1." Accuracy monitor 314 may then determine an accuracy value using the new values. In one embodiment, accuracy monitor 314 divides the new average used count ("1") by the new average total count ("3"), resulting in an accuracy value of 0.3333. This value may be multiplied by a suitable value to generate an integer value, such as, for example, by 100 to generate an accuracy value of 33 or by 1000 to generate an accuracy value of 333. This accuracy value may be sent to another circuit, such as, e.g., prefetch throttle 212 in FIG. 2, in order to determine if prefetch operations should be suspended in the next time interval.

It is noted that the tables of FIG. 3A are merely an example. In other embodiments, additional information, such as related address information, may be included in cache memory 302. The tables of FIG. 3A are not intended to represent a physical arrangement of stored data in a cache memory or other circuits, but instead, are intended to merely illustrate a logical organization of data.

Figure 3B:
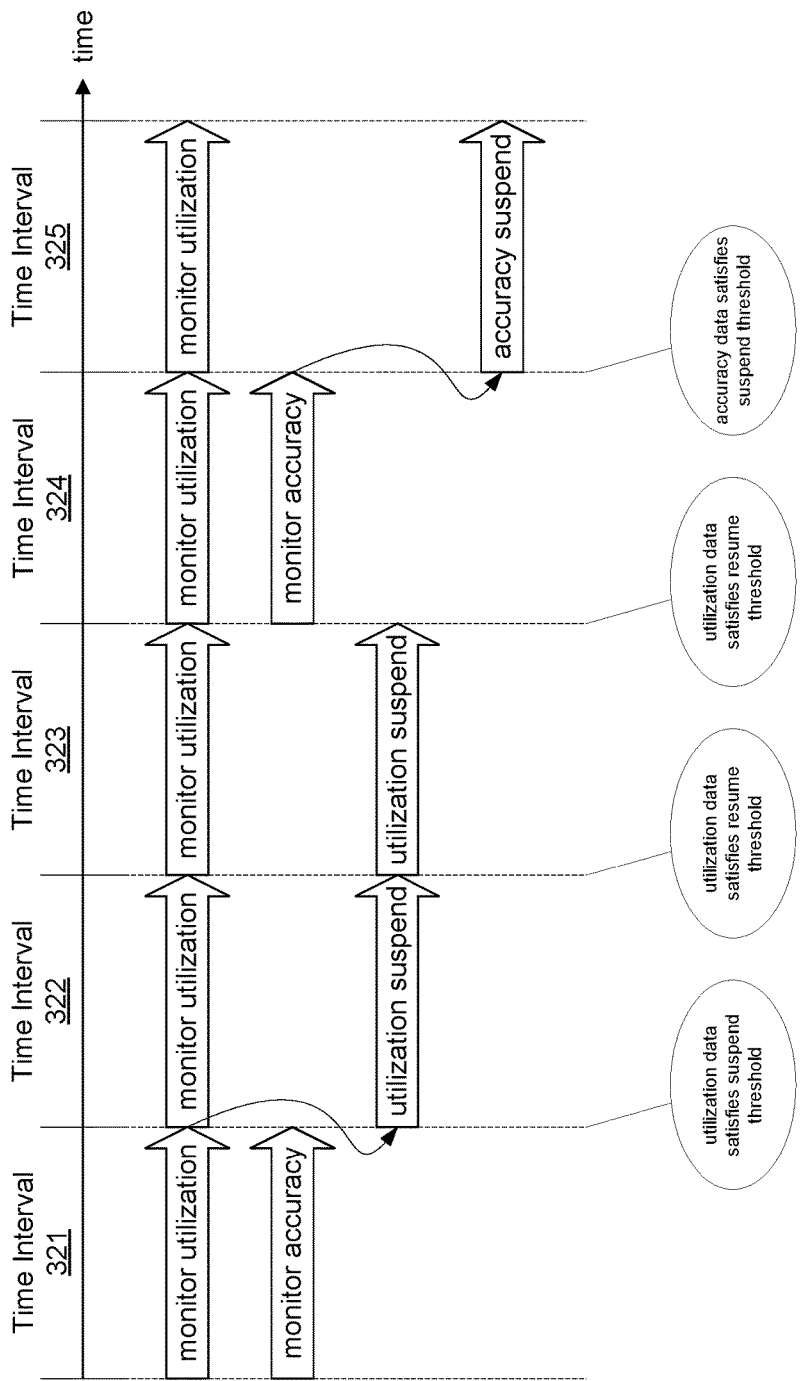
FIG. 3B shows an operational time line for an embodiment of a memory prefetching sub-system in a processor.

Proceeding to FIG. 3B, an operational time line for an embodiment of a processor memory prefetching system is shown. Time line 300 may apply to the embodiments of processor 100 or processor 200 in FIGS. 1 and 2, respectively. Time line 300, in the illustrated embodiment, includes five time intervals; time interval 321 through time interval 325. These time intervals may correspond to time intervals discussed above in regards to FIGS. 2 and 3. In some embodiments, a time interval for monitoring utilization of fetching resources may be a different length of time than a time interval for monitoring accuracy of prefetch requests. In the illustrated embodiment, however, the time intervals for monitoring both utilization and accuracy are the same. Referring to processor 200 in FIG. 2 and to FIG. 3B, time line 300 begins with time interval 321.

During time interval 321, prefetch circuit 204 is active, utilization of fetch pipeline 216 is monitored by utilization monitor 210, and accuracy of prefetch request from prefetch circuit 204 is monitored by accuracy monitor 214. At the end of time interval 321, both utilization monitor 210 and accuracy monitor 214 send their respective data to prefetch throttle 212. In the illustrated embodiment, prefetch throttle 212 determines that the utilization data satisfies a utilization suspend threshold, and, in response, asserts suspend signal 220, thereby suspending prefetch requests from prefetch circuit 204.

In time interval 322, utilization monitor 210 may continue to operate while accuracy monitor 214 may pause operation while prefetch circuit 204 is suspended. At the end of time interval 322, utilization monitor 210 sends data to prefetch throttle 212. Prefetch throttle 212 may determine that the utilization data satisfies a utilization resume threshold. In the illustrated embodiment, however, the utilization resume threshold needs to be satisfied for two consecutive time intervals before prefetching may resume. In other embodiments, one time interval may be sufficient, or satisfying the threshold for more than two consecutive time intervals may occur before resuming prefetching.

Operation of utilization monitor 210 and accuracy monitor 214 may be the same in time interval 323 as it was for time interval 322. At the end of time interval 323, prefetch throttle 212 may again receive utilization data from utilization monitor 210 and again determine that the utilization resume threshold has been satisfied. Prefetch throttle 212 may de-assert suspend signal 220, thereby allowing prefetch circuit 204 to resume issuing prefetch requests in time interval 324. Accuracy monitor 214 may also resume operation in time interval 324. At the end of time interval 324, accuracy monitor 214 and utilization monitor 210 send their respective data to prefetch throttle 212. Prefetch throttle may determine that the accuracy data satisfies an accuracy suspend threshold and assert suspend signal 220 again. In time interval 325, prefetch circuit 204 is disabled and, therefore, doesn't issue prefetch requests. Accuracy monitor 214 also suspends operations for the duration of time interval 325. In various embodiments, suspend signal 220 may be asserted for a single time interval or for any suitable number of time intervals.

It is noted that the time line of FIG. 3B is an example for demonstrating disclosed concepts. In other embodiments, time intervals may be different for monitoring accuracy and monitoring utilization. Although the time intervals are shown to be similar lengths, the amount of time in any given time interval may vary based on the monitored data, for example.

Figure 4:
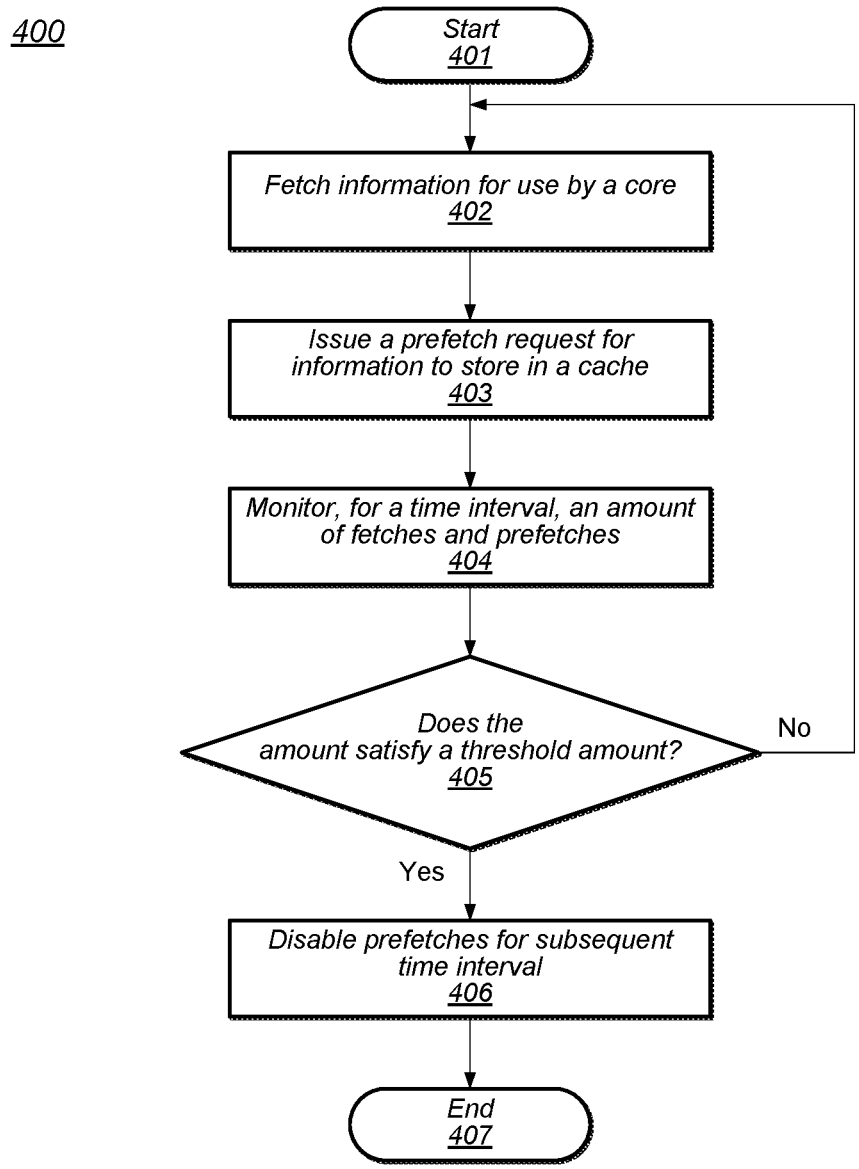
FIG. 4 illustrates a flow diagram of an embodiment of a method for throttling memory prefetch requests based on a determined utilization.

Turning now to FIG. 4, a flow diagram of an embodiment of a method for throttling memory prefetch requests based on a determined utilization is illustrated. In various embodiments, method 400 may be applied to a processor, such as, for example, processor 100 in FIG. 1 or processor 200 in FIG. 2. Referring collectively to FIGS. 2 and 4, method 400 begins in block 401.

A cache memory fetches information for use by a processor core (block 402). In the illustrated embodiment, fetch circuits in cache memory 202 issue at least one request to fetch pipeline 216 to retrieve information from memory 203. This fetch request to fetch pipeline 216 may occur due to a cache miss in cache memory 202. The requested information may include instructions and/or data to be used by processor core 201. In various embodiments, cache memory 202 may correspond to any level of cache memory in a processor, such as, for example, L1 cache, L2 cache, L3 cache, or any suitable memory system that issues fetch requests in a computing system. Similarly, memory 203 may, in various embodiments, correspond to any suitable memory type of memory in a computing system, such as, e.g., a higher level cache memory than cache memory 202 or a system memory coupled to a processor.

A prefetch circuit issues a request to prefetch information to store in the cache memory (block 403). Prefetch circuit 204, in one embodiment, issues a prefetch request to fetch pipeline 216 to retrieve information from memory 203 for storage in cache memory 202. Prefetch circuit 204 may use a predicted address that specifies a location, from which to retrieve the information. As described above, this information may include instructions and/or data predicted to be used by processor core 201.

During a particular time interval, a utilization monitor tracks an amount of memory fetch requests (block 404). In the illustrated embodiment, a utilization monitor, such as, e.g., utilization monitor 210, tracks a number of fetch requests issued by fetch circuits in cache memory 202 as well as a number of prefetch requests issued by prefetch circuit 204. In various embodiments, utilization monitor 210 may be included within prefetch circuit 204 or may be a separate circuit coupled to prefetch circuit 204. In some embodiments, utilization monitor 210 may count a number of fetch and prefetch requests made to fetch pipeline 216. In the illustrated embodiment, utilization monitor 210 counts a number of processor cycles for which fetch pipeline 216 is idle. The particular time interval may correspond to any suitable length of time and may be measured as a suitable number of processor cycles. For example, a suitable number of processor cycles may correspond to tens of processor cycles, or to thousands of processor cycles, or more.

Further operations of method 400 may depend on the tracked amount of requested memory fetch requests (block 405). At the end of the predetermined time interval, utilization monitor 210 sends a value corresponding to the usage of the memory resources of cache memory 202 to a prefetch throttling circuit, such as, e.g., prefetch throttle 212. Similar to utilization monitor 210, prefetch throttle 212 may be included within prefetch circuit 204 or a separate circuit coupled to prefetch circuit 204. This value may correspond to a count of idle cycles of fetch pipeline 216 or may otherwise indicate a level of usage of fetch pipeline 216. Based on this indication, prefetch throttle 212 makes a determination if prefetch requests issued by prefetch circuit 204 should be suspended. Prefetch throttle 212 compares the received indication and compares this value to a utilization threshold. If the threshold is satisfied, e.g., an amount of idle cycles is less than the threshold amount, then the method moves to block 406 to disable prefetch requests. Otherwise, the method returns to block 402 to continue issuing fetch requests and prefetch requests.

If the utilization threshold was satisfied, then the prefetch circuit suspends issuing prefetch requests for a subsequent time interval (block 406). If the number of idle cycles of fetch pipeline 216 is below the threshold amount, then prefetch throttle 212 asserts suspend signal 220. In response to this assertion of suspend signal 220, prefetch circuit 204 suspends issuing further prefetch requests. The suspension may last for at least one time interval. The memory resources may continue to issue memory fetch requests while the prefetch requests are disabled. The method ends in block 407. In some embodiments, method 500, described below, may be performed in response to the end of method 400.

It is noted that method 400 of FIG. 4 is one example. The operations illustrated in FIG. 4 are depicted as being performed in a sequential fashion. In other embodiments, however, some operations may be performed in parallel or in a different sequence. In some embodiments, additional operations may be included.

Figure 5:
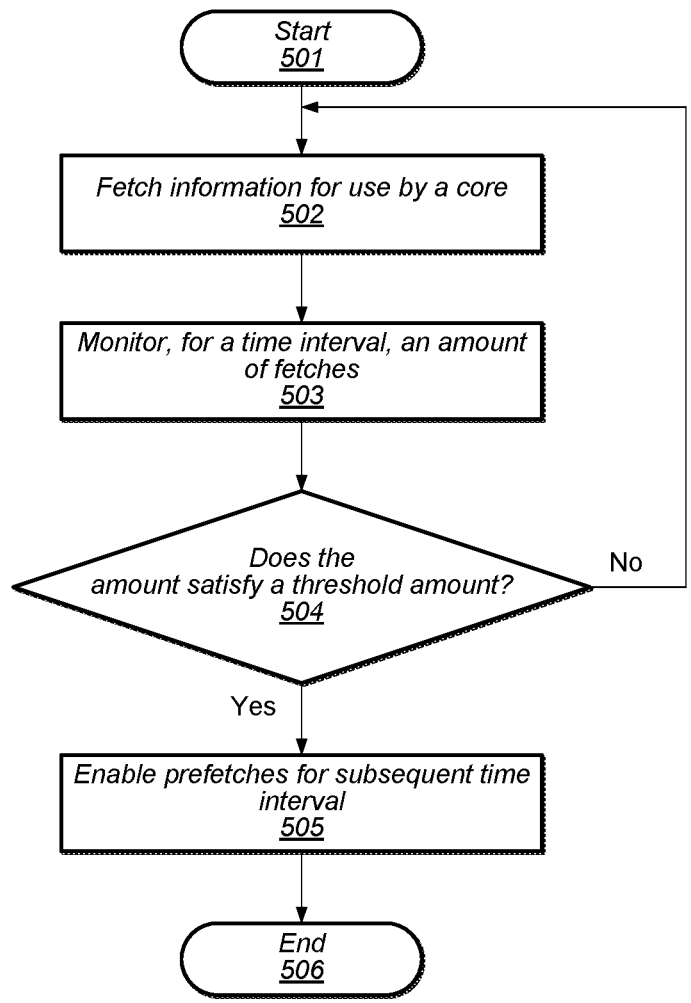
FIG. 5 includes a flow diagram showing an embodiment of a method for enabling memory prefetch requests based on a determined utilization.

Turning to FIG. 5, a flow diagram showing a method for enabling memory prefetch requests based on a determined utilization is shown. In some embodiments, method 500 may be applied to a processor, such as, for example, processor 100 in FIG. 1 or processor 200 in FIG. 2. Method 500 may be performed after one or more performances of method 400 as a method for resuming prefetch requests after the requests have been suspended. Referring collectively to FIGS. 2 and 5, method 500 begins in block 501 after block 406 of method 400 has occurred and prefetch requests are currently suspended.

A cache memory fetches information for use by a processor core (block 502). In the illustrated embodiment, fetch circuits in cache memory 202 issue one or more requests to fetch pipeline 216 for information from memory 203. As previously described, this fetch request to fetch pipeline 216 may occur due to a cache miss in cache memory 202. Although, suspend signal 220 is currently asserted and, therefore, prefetch requests by prefetch circuit 204 are suspended, fetch requests from the fetch circuits of cache memory 202 may continue to issue to fetch pipeline 216.

A utilization monitor tracks an amount of memory fetch requests during a particular time interval, (block 503). Utilization monitor 210, in the illustrated embodiment, tracks an amount of activity in fetch pipeline 216. As described above for method 400, utilization monitor 210 may count a number of fetch requests made by the fetch circuits of cache memory 202, or may count a number of processor cycles for which fetch pipeline 216 is idle. The duration of the particular time interval may remain the same as was used in block 404 of method 400, or the duration may be adjusted in response to the high utilization of fetch pipeline 216.

Continuing operations of method 500 may depend on the tracked amount of fetch requests (block 504). In the illustrated embodiment, utilization monitor 210, at the end of the particular time interval, sends the value indicating an amount of usage of fetch pipeline 216 to prefetch throttle 212. Prefetch throttle 212, similar to the description above for method 400, determines if the amount of utilization of fetch pipeline 216 has fallen enough to allow prefetch requests to resume. To make the determination, prefetch throttle 212 may compare the received amount to a threshold amount and determines if the threshold is satisfied. In some embodiments, the threshold amount may be the same as used in method 400. In other embodiments, the threshold amount for resuming prefetch requests may be different. For example, if the received value corresponds to a count of idle cycles of fetch pipeline 216, then a resume threshold may be higher than a suspend threshold. To satisfy the threshold may correspond to determining that the received idle count is higher than the resume threshold, resulting in more idle cycles being counted before prefetch requests may be resumed. In some embodiments, the threshold may be compared to the received idle count for more than one time interval, and to satisfy the threshold may include determining that the idle count is greater than the threshold for two or more consecutive time intervals. If the threshold is satisfied, then the method moves back to block 502 to continue issuing fetch requests. Otherwise, the method moves to block 505 to resume prefetch requests.

Prefetch throttle 212 enables prefetch requests for a subsequent time interval (block 505). After determining that the resume threshold has been satisfied, prefetch throttle 212, in the illustrated embodiment, de-asserts suspend signal 220. In response to the de-assertion of suspend signal 220, prefetch circuit 204 may resume issuing prefetch requests to fetch pipeline 216. The method ends in block 506. Upon ending method 500, method 400 may be performed.

It is noted that the method illustrated in FIG. 5 is merely an example embodiment. Although the operations illustrated in the method in FIG. 5 are depicted as being performed in a sequential fashion, in other embodiments, some of the operations may be performed in parallel or in a different sequence. In some embodiments, additional operations may be included.

Figure 6:
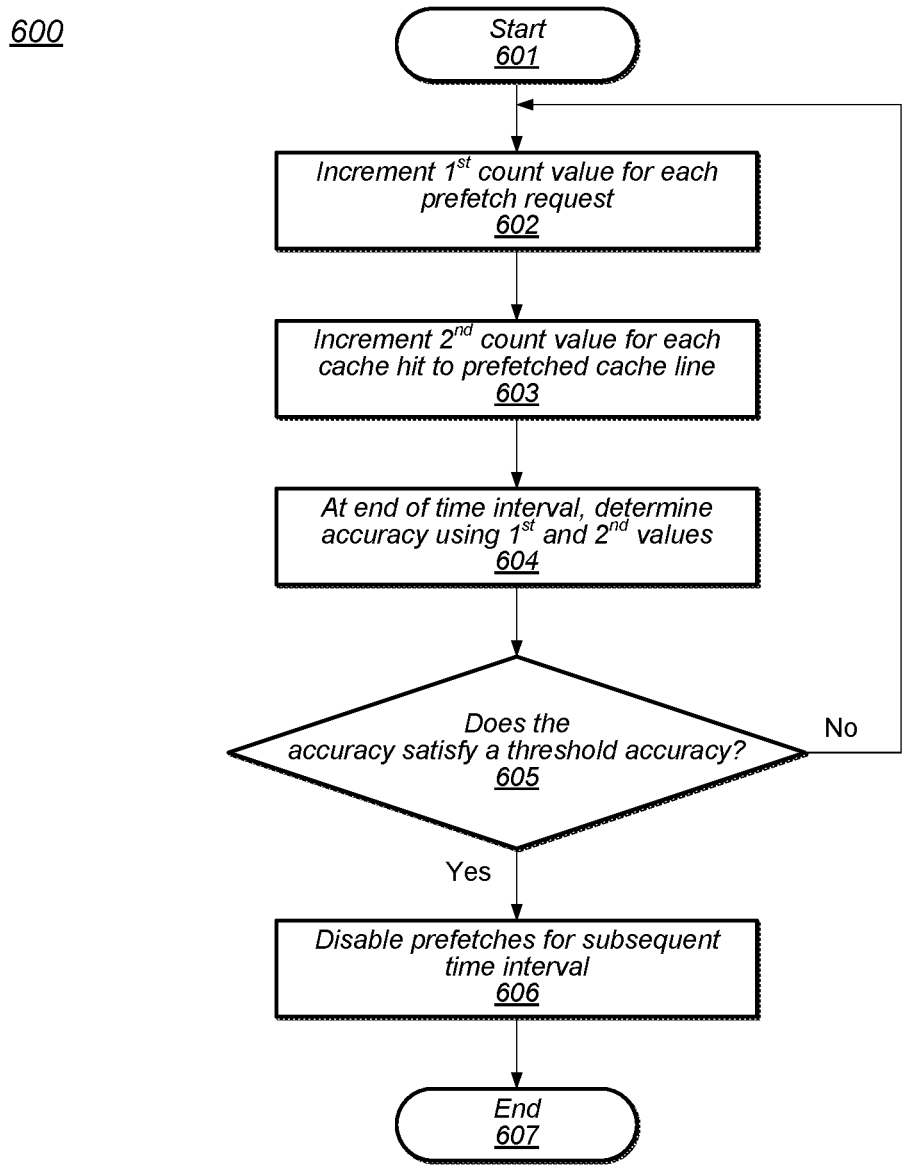
FIG. 6 depicts a flow diagram of an embodiment of a method for throttling memory prefetch requests based on a determined accuracy.

Moving to FIG. 6, a flow diagram of a method for throttling memory prefetch requests based on a determined accuracy is depicted. Method 600 may be performed in parallel with method 400 and/or method 500, by a processor such as processors 100 or 200. Referring collectively to FIG. 2 and the flowchart in FIG. 6, the method may begin in block 601.

A first count value is incremented for in response to issued prefetch requests (block 602). In the illustrated embodiment, accuracy monitor 214 increments a count value when prefetch circuit 204 issues a prefetch request to fetch pipeline 216 to fill one or more cache lines in cache memory 202. In some embodiments, accuracy monitor 214 may include a first counter circuit that is incremented, in response to an issued prefetch request. When fetch pipeline 216 fulfills the prefetch request, one or more flag bits of the prefetched cache line are set to indicate that the line was prefetched.

A second count value is incremented for each cache hit to a prefetched cache line (block 603). Accuracy monitor 214, in the illustrated embodiment, increments a count value when a cache line in cache memory 202 is hit and the one or more flag bits of the hit cache line are set. In some embodiments, the one or more flag bits may be reset to an alternate value after the count value has been incremented to avoid counting a prefetched cache line more than once when determining a prefetch accuracy. To increment the second count value, accuracy monitor 214, in some embodiments, may increment a second counter circuit.

An accuracy value is determined at the end of a particular time interval using the first and second count values (block 604). Accuracy monitor 214 increments the first and second count values during the particular time period. In the illustrated embodiment, the particular time interval is the same as used by utilization monitor 210 and described above in methods 400 and 500. In other embodiments, however, accuracy monitor 214 may use a different time interval than utilization monitor 210. At the end of the time interval, accuracy monitor 214 determines an accuracy value using the first and second count values by, for example, determining a ratio of the two count values. In other embodiments, accuracy monitor 214 may determine an average running value for each of the first and second count values, and use these average running values to determine the accuracy value. The determined accuracy value is sent to prefetch throttle 212 and the first and second count values may be initialized to a suitable starting value.

Subsequent operations of method 600 may depend on the accuracy value (block 605). Prefetch circuit 204, in the illustrated embodiment, compares the received accuracy value to an accuracy threshold. If the accuracy threshold is satisfied, then the method moves to block 606 to disable prefetch request. For example, to satisfy the accuracy threshold, prefetch throttle 212 may determine if the accuracy value is less than the accuracy threshold. In some embodiments, prefetch throttle may utilize a combination of the accuracy and the utilization, as determined above, to determine if prefetch requests will be suspended in the subsequent time interval. For example, the value of the accuracy threshold may be adjusted based on the amount of fetched requests determined in methods 400 or 500. In other embodiments, the utilization threshold described above may be adjusted based on the accuracy value. If the accuracy threshold is not satisfied, then the method returns to block 602 to restart the first and second counts.

If the accuracy threshold was satisfied, then the prefetch circuit suspends issuing prefetch requests for a subsequent time interval (block 606). In the illustrated embodiment, if the accuracy value is below the threshold amount, then prefetch throttle 212 asserts suspend signal 220. Prefetch circuit 204, in response to this assertion, suspends issuing further prefetch requests. The suspension, in some embodiments, may last for a predetermined number of time intervals. The memory resources may continue to issue memory fetch requests while the prefetch requests are disabled. The method ends in block 607.

It is noted that the method of FIG. 6 is merely an example. The operations illustrated in the method in FIG. 6 are depicted as being performed serially. In other embodiments, however, some of the operations may be performed in parallel or in a different sequence. In some embodiments, additional operations may be included. As disclosed above, method 600 may be performed in conjunction with methods 400 and 500.

Figure 7:
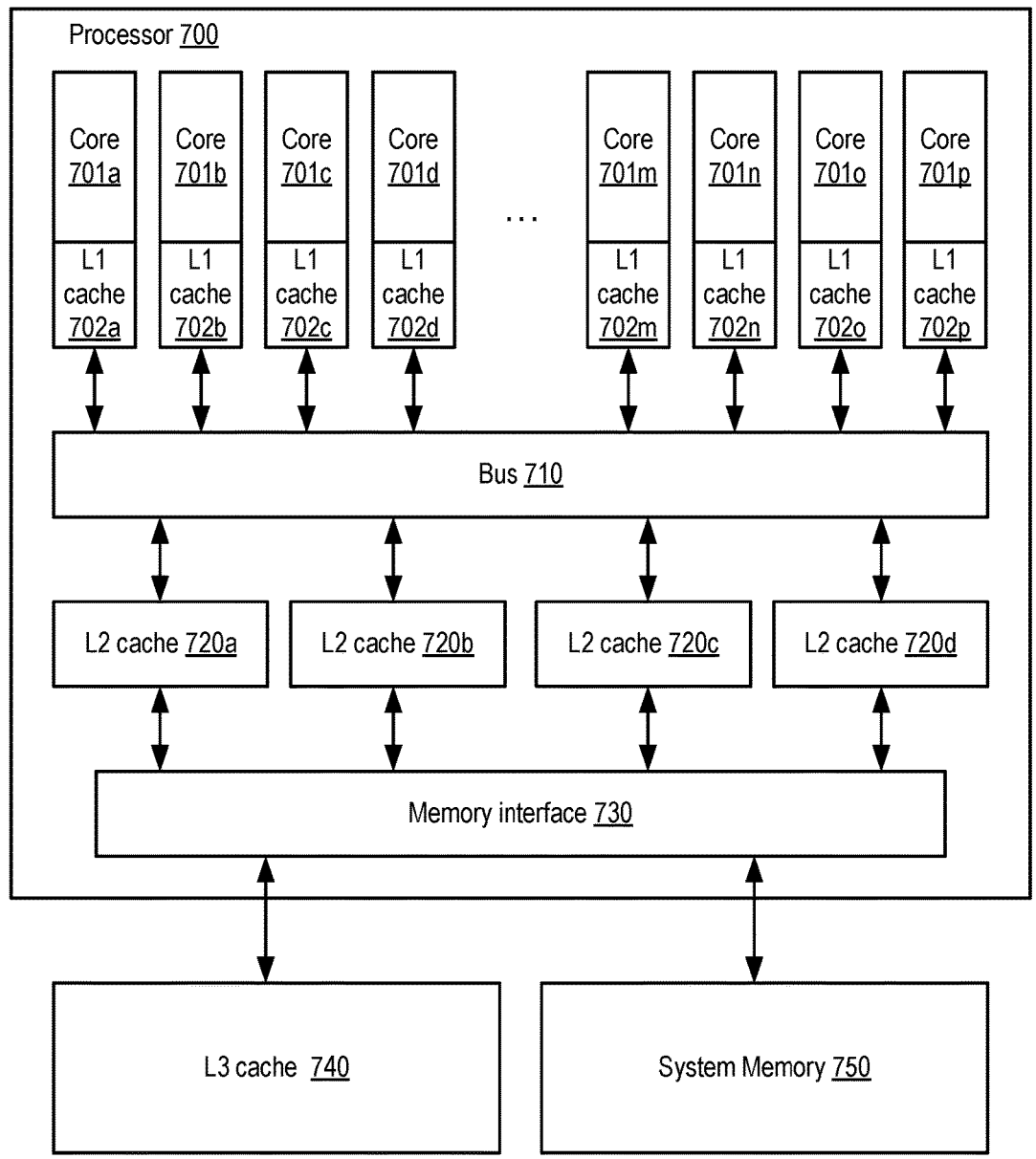
FIG. 7 illustrates a block diagram illustrating an embodiment of a multi-core processor.

An example of a multicore processor is depicted in FIG. 7 as an example of a processor that may include one or more prefetchers as described herein. In the illustrated embodiment, processor 700 includes sixteen instances of a processor core, denoted as cores 701a through 701p (or simply 701a-p for brevity), although for clarity, not all instances are shown in FIG. 1. Cores 701a-p may each include a respective L1 cache 702a-702p. Cores 701a-p may be coupled to L2 caches 720a through 720d through bus 710. In addition, cores 701a-p may be coupled to memory interface 730 through L2 caches 720a-d. Memory interface 730 may be further coupled to L3 cache 740 as well as system memory 750. It is noted that in various embodiments, the organization of FIG. 1 may represent a logical organization rather than a physical organization, and other components may also be employed. For example, in some embodiments, cores 701a-p and L2 caches 720a-d may not connect directly to bus 710, but may instead interface with the bus through intermediate logic. L3 cache 740 and system memory may reside external to processor 700.

Cores 701a-p may be configured to execute instructions and to process data according to a particular Instruction Set Architecture (ISA). In one embodiment, cores 701a-p may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 701 may be configured to execute multiple threads concurrently, where each thread may include a set of instructions that may execute independently of instructions from another thread. In various embodiments, it is contemplated that any suitable number of cores 701a-p may be included within a processor, and that each of cores 701a-p may concurrently process some number of threads.

L1 caches 702a-p may reside within cores 701a-p or may reside between cores 701a-p and bus 710. L1 caches 702a-p may be configured to cache instructions and data for use by their respective cores 701a-p. In some embodiments, each individual cache 702a-p may be implemented using set-associative or direct-mapped techniques. For example, in one embodiment, L1 caches 702a-p may be 16 kilobyte (KB) caches, where each L1 cache 702a-p is 2-way set associative with a 16-byte line size, although other cache sizes and geometries are possible and contemplated.

Each cache line in a cache may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A given processor core may access a cache with a direct address of the memory location, a translated address based on lookup tables, or through an address calculated based on an instruction's address mode. In addition to a coherency state of the cache line, flags may include one or more bits indicating if the information stored in the respective cache line were fetched in response to a cache miss or prefetched by a prefetch circuit.

Bus 710 may be configured to manage data flow between cores 701a-p and the shared L2 caches 720a-d. In one embodiment, bus 710 may include logic (such as multiplexers or a switch fabric, for example) that allows any core 701a-p to access any bank of L2 cache 720a-d, and that conversely allows data to be returned from any bank of L2 cache 720a-d to any core 701a-p. Bus 710 may be configured to concurrently process data requests from cores 701a-p to L2 cache 720a-d as well as data responses from L2 cache 720a-d to cores 701a-p. In some embodiments, bus 710 may include logic to queue data requests and/or responses, such that requests and responses may not block other activity while waiting for service. Additionally, in one embodiment, bus 710 may be configured to arbitrate conflicts that may occur when multiple cores 701a-p attempt to access a single bank of L2 cache 720a-d or vice versa. It is noted that in various embodiments, bus 710 may be implemented using any suitable type of interconnect network, which, in some embodiments, may correspond to a physical bus interconnect.

L2 caches 720a-d (collectively referred to as L2 caches 720) may be configured to cache instructions and data for use by a respective set of cores 701a-p. For example, L2 cache 720a may store data for cores 701a-d, L2 cache 720b for cores 701e-h (not shown), L2 cache 720c for cores 701i-1 (not shown), and L2 cache 720d may similarly be coupled to cores 701m-p. As the number of cores 701 is increased, the size and/or number of L2 caches 720 may also be increased in order to accommodate the additional cores 701. For example, in an embodiment including 16 cores, L2 cache 720 may be configured as 4 caches of 2 MB each, with each cache including 4 individual cache banks of 512 KB, where each bank may be 16-way set associative with 512 sets and a 64-byte line size, although any other suitable cache size or geometry may also be employed.

In some embodiments, L2 caches 720 may include various queues and buffers configured to manage the flow of data to and from bus 710 as well as to and from L3 cache 740. For example, such embodiments of L2 caches 720 may implement a fill buffer configured to store fill data arriving from memory interface 730, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). In some embodiments, multiple banks of L2 caches 720 may share single instances of certain data structures or other features. For example, a single instance of a fill buffer may be shared by multiple banks of L2 caches 720 in order to simplify the physical implementation (e.g., routing and floor-planning) of L2 caches 720. Despite this sharing, individual banks of L2 caches 720 may be configured to concurrently and independently process accesses to data stored within the banks when such concurrency is possible.

Like L1 caches 702a-p and L2 caches 720, L3 cache 740 may be configured to cache instructions and data for use by cores 701a-p. In some embodiments, L3 cache may be implemented on a separate memory chip external to processor 700 and accessed through memory interface 730. In other embodiments, L3 cache may be implemented on the same die as processor 700, in which case, L3 cache 740 may be accessed directly. Similar to L1 caches 702a-p, L3 cache 740 may be implemented using set-associative or direct-mapped techniques. For example, in one embodiment, L3 cache 740 may be an 8 megabyte (MB) cache, where the 8 MB bank is 16-way set associative with a 16-byte line size, although other cache sizes and geometries are possible and contemplated.

The cache hierarchy may be established such that any core 701 may first access its respective L1 cache 702. If the access to L1 cache 702 is a miss, then the respective L2 cache 720 may be accessed. If the L2 cache 720 access is a miss, then L3 cache 740 may be accessed next. If all three cache levels miss, then system memory 750 may be accessed through memory interface 730.

Memory interface 730 may be configured to manage the transfer of data between L2 caches 720 and L3 cache 740 and/or system memory 750 in response to L2 fill requests and data evictions, for example. In some embodiments, multiple instances of memory interface 730 may be implemented, with each instance configured to control a respective bank of L3 cache 740 or system memory 750. Memory interface 730 may be configured to interface to any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 730 may be configured to support interfacing to multiple different types of memory, such that L3 cache 740 and system memory 750 may be composed of two or more of the listed types. In other embodiments, L3 cache 740 may correspond to a reserved portion of system memory 750.

Respective prefetch circuitry, such as, for example, prefetch circuits 104 or 204 in FIGS. 1 and 2, respectively, may be coupled to any suitable level of cache memory in processor 700. In one embodiment, for example, a respective prefetch circuit 204 may be coupled to each of L2 caches 720a-d. Respective utilization monitors 210, prefetch throttles 212, and accuracy monitors 214 may be coupled to each of L2 caches 720a through 720d. In such an example, prefetch circuits 204 may issue prefetch request for each of the four cores 701 supported by a particular L2 cache 720. Referring to L2 cache 720a, for example, accuracy and utilization data may be tracked for each of cores 701a-d. Accuracy monitor 214 and utilization monitor 210 may include a set of counters and/or registers corresponding to each of cores 701a-d. In addition, prefetch throttle 212 may include a suspend signal 220 for each of cores 701a-d, and make prefetch suspend/resume determinations for each core 701a-d individually based on respective utilization and accuracy data. In some embodiments, prefetch throttle 212 may adjust thresholds values for each core 701a-d individually and/or based on an overall utilization of prefetch circuit 204. In one embodiment, accuracy data corresponding to each of cores 701a-d may be used to set respective utilization thresholds for each of the cores.

It is noted that FIG. 7 is merely an example of a multicore processor. In other embodiments, processor 700 may include network and/or peripheral interfaces. The physical structure may not be represented by FIG. 7 as many other physical arrangements may be possible and are contemplated.

It is further noted that the systems and circuits described herein may be implemented in any suitable digital logic process. For example, some embodiments may utilize a Complementary Metal-Oxide Semiconductor Field-Effect Transistor (CMOS) process. Such CMOS logic process may utilize planar devices, non-planar devices, or a combination of the two. Circuits designed in a CMOS process may include various combinations of smaller logic circuits, such as, for example, invertors, AND gates, OR gates, NAND gates, NOR gates, as well as data capturing circuits such as flip-flops and latches.

Numerous variations and modifications will become apparent to those skilled in the art once the above disclosure is fully appreciated. It is intended that the following claims be interpreted to embrace all such variations and modifications.

What is claimed is:

1. A system, comprising:
   a processor core;
   a memory configured to store information for use by the processor core;
   a cache memory configured to issue a fetch request for information from the memory for use by the processor core;
   a prefetch circuit configured to:
      issue a prefetch request for information from the memory to store in the cache memory using a predicted address;
      over a particular time interval:
         determine a utilization value using a number of fetch requests from the cache memory and a number of prefetch requests from the prefetch circuit; and
         determine an accuracy value using the number of prefetch requests from the prefetch circuit and a number of cache hits to prefetched information in the cache memory; and
      disable prefetch requests from the memory for a subsequent time interval in response to a determination that at least one of the utilization value and the accuracy value satisfies a respective threshold value.

2. The system of claim 1, wherein to determine the utilization value, the prefetch circuit is further configured to track a number of idle cycles in a fetch pipeline associated with the cache memory.

3. The system of claim 2, wherein to disable prefetch requests from the memory for the subsequent time interval, the prefetch circuit is further configured to suspend issuing of prefetch requests for the subsequent time interval in response to a determination that the number of idle cycles is less than a threshold number.

4. The system of claim 1, wherein the prefetch circuit is further configured to, in response to a determination that the utilization value satisfies the respective threshold value, resume issuing of prefetch requests for a next time interval in response to a determination that the utilization value fails to satisfy the respective threshold value for a given number of time intervals.

5. The system of claim 1, wherein the prefetch circuit is further configured to, in response to a determination that the accuracy value satisfies the respective threshold value, resume issuing of prefetch requests for a next time interval in response to a determination that issuing of prefetch requests has been disabled for a particular number of time intervals.

6. The system of claim 1, wherein to determine the accuracy value, the prefetch circuit is further configured to:
   increment, over the particular time interval, a first count value for each issued prefetch request by the prefetch circuit; and
   increment, over the particular time interval, a second count value for each cache hit that includes information stored as a result of a prefetch request; and
   determine, at an end of the particular time interval, the accuracy value based on the first count value and the second count value.

7. The system of claim 1, wherein the prefetch circuit is further configured to, while prefetch requests are disabled:
   continue to determine the utilization value for the subsequent time interval; and cease to determine the accuracy value for the subsequent time interval.

8. A method, comprising:
fetching, by a cache memory, information from a memory for use by a processor core;
issuing, by a prefetch circuit, a prefetch request for information from the memory to store in the cache memory using a predicted address;
over a particular time interval:
determining, by the prefetch circuit, a utilization value using a number of fetch requests by the cache memory and a number of prefetch requests by the prefetch circuit; and
determining, by the prefetch circuit, an accuracy value using the number of prefetch requests from the prefetch circuit and a number of cache hits to prefetched information in the cache memory; and
disabling, by the prefetch circuit, prefetch requests from the memory for a subsequent time interval in response to a determination that at least one of the utilization value and the accuracy value satisfies a respective threshold value.

9. The method of claim 8, wherein determining the utilization value comprises tracking a number of idle cycles in a fetch pipeline associated with the cache memory.

10. The method of claim 9, wherein disabling prefetch requests from the memory for the subsequent time interval comprises suspending issuing of prefetch requests for the subsequent time interval in response to determining that the number of idle cycles is less than a threshold number.

11. The method of claim 8, further comprising, in response to determining that the utilization value satisfies the respective threshold value, resuming issuing of prefetch requests for a next time interval in response to determining that the utilization value fails to satisfy the respective threshold value for a given number of time intervals.

12. The method of claim 8, further comprising, in response to determining that the accuracy value satisfies the respective threshold value, resume issuing of prefetch requests for a next time interval in response to a determination that issuing of prefetch requests has been disabled for a particular number of time intervals.

13. The method of claim 8, wherein determining the accuracy value, comprises:
incrementing, by the prefetch circuit over the particular time interval, a first count value for each prefetch request issued by the prefetch circuit; and
incrementing, by the prefetch circuit over the particular time interval, a second count value for each cache hit that includes information stored as a result of a prefetch request; and
determining, at an end of the particular time interval, the accuracy value based on the first count value and the second count value.

14. The method of claim 8, further comprising, while prefetch requests are disabled:
continuing to determine the utilization value for the subsequent time interval; and
ceasing to determine the accuracy value for the subsequent time interval.

15. An apparatus, comprising:
a prefetch issue circuit configured to issue a prefetch request for information from a memory to store in a cache memory using a predicted address;
a utilization monitor circuit configured to, over a particular time interval, determine a utilization value using a number of fetch requests by the cache memory and a number of prefetch requests issued by the prefetch issue circuit;
an accuracy monitor configured to determine an accuracy value for issued prefetch requests over the particular time interval, and
a prefetch throttle circuit configured to disable the prefetch issue circuit for a subsequent time interval, in response to a determination that at least one of the utilization value and the accuracy value satisfies a respective threshold value.

16. The apparatus of claim 15, wherein to determine the utilization value, the utilization monitor circuit is further configured to track a number of idle cycles in a fetch pipeline associated with the cache memory.

17. The apparatus of claim 16, wherein to disable the prefetch issue circuit for the subsequent time interval, the prefetch throttle circuit is further configured to disable the prefetch issue circuit for the subsequent time interval in response to a determination that the number of idle cycles is less than a threshold number.

18. The apparatus of claim 15, wherein the prefetch throttle circuit is further configured to, in response to a determination that the utilization value satisfies the respective threshold value, enable the prefetch issue circuit for a next time interval in response to a determination that the utilization value fails to satisfy the respective threshold value for a given number of time intervals.

19. The apparatus of claim 15, wherein the prefetch throttle circuit is further configured to, in response to a determination that the accuracy value satisfies the respective threshold value, resume issuing of prefetch requests for a next time interval in response to a determination that the prefetch issue circuit has been disabled for a particular number of time intervals.

20. The apparatus of claim 15, wherein the accuracy monitor is further configured to cease determining the accuracy value for the subsequent time interval; and
wherein the utilization monitor circuit is further configured to continue to determine the utilization value for the subsequent time interval.

* * * * *

UNITED STATES PATENT AND TRADEMARK OFFICE
CERTIFICATE OF CORRECTION

PATENT NO. : 10,474,578 B2
APPLICATION NO. : 15/691302
DATED : November 12, 2019
INVENTOR(S) : Lee et al.

Page 1 of 1

It is certified that error appears in the above-identified patent and that said Letters Patent is hereby corrected as shown below:

In the Specification

In Column 16, Line 24, delete "701i-1" and insert -- 701i-l --, therefor.

In the Claims

In Column 20, Line 18, in Claim 15, delete "interval," and insert -- interval; --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*